(12) United States Patent
Zerbst et al.

(10) Patent No.: US 6,264,541 B1
(45) Date of Patent: Jul. 24, 2001

(54) APPARATUS FOR THE PRODUCTION OF STUFFED SAUSAGE PRODUCTS

(75) Inventors: Oliver Zerbst, Verden; Dieter Meier, Kirchlinteln; Klaus Hiller, Dörverden, all of (DE)

(73) Assignee: Vemag Maschinen-und Anlageneau GmbH (DE)

( * ) Notice: Subject to any disclaimer, the term of this patent is extended or adjusted under 35 U.S.C. 154(b) by 0 days.

(21) Appl. No.: 09/561,739

(22) Filed: Apr. 20, 2000

(30) Foreign Application Priority Data

Apr. 26, 1999 (DE) .............................. 199 18 711

(51) Int. Cl.[7] .................................................. A22C 11/02
(52) U.S. Cl. .................. 452/37; 452/27; 452/38
(58) Field of Search .................. 452/37, 27, 38, 452/45, 30, 35, 46

(56) References Cited

U.S. PATENT DOCUMENTS

| 3,553,768 | 1/1971 | Wilmsen . | |
|---|---|---|---|
| 5,013,279 | 5/1991 | Southworth | 452/46 |
| 5,330,382 | * 7/1994 | Powers | 452/37 |
| 6,132,302 | * 10/2000 | Hiller et al. | 452/35 |

FOREIGN PATENT DOCUMENTS 31 180084 * 11/1982 (DE) ..................... 452/45

* cited by examiner

*Primary Examiner*—Willis Little
(74) *Attorney, Agent, or Firm*—Wood, Herron & Evans, L.L.P.

(57) ABSTRACT

What is described is an apparatus for stuffing casings or similar receptacles with paste, in particular with sausage meat or other foods in the form of paste, using a portioning means (16) that stuffs adjustable portions of the paste through a stuffing horn (14) into a casing (62) of a pre-defined caliber or caliber group, wherein said casing is pulled portion-wise during stuffing from a casing holder (casing brake 24). A guide tube (26) is disposed after and as an extension to the casing holder (24), the internal diameter of said guide tube 26 being approximately the same as the smaller outer diameter of the pre-defined casing caliber and/or the pre-defined casing caliber group, such that the guide tube 26 has a coating of lubricant on its inner surface and that the casing is pulled into and through the guide tube 26 in the process of being stuffed.

20 Claims, 5 Drawing Sheets

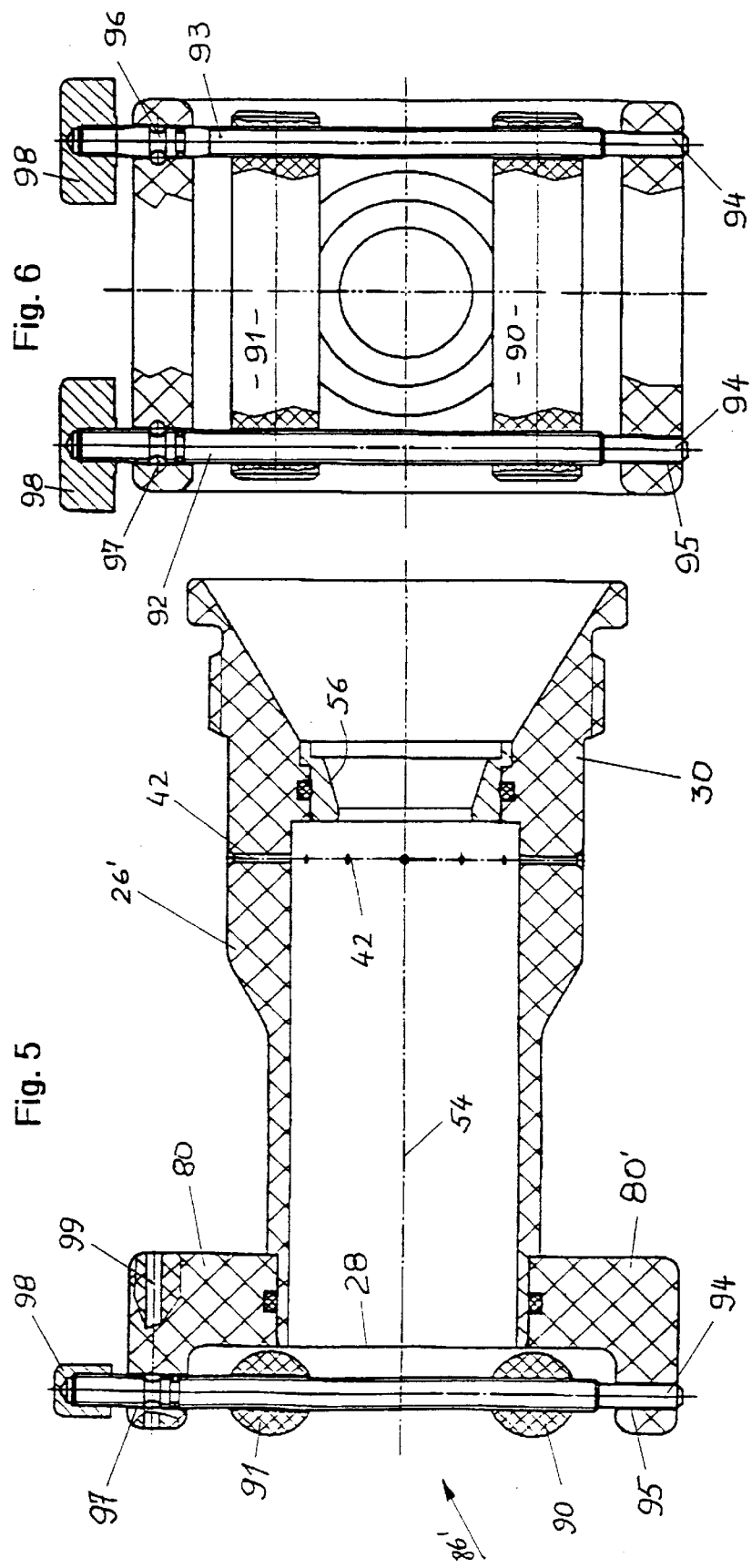

APPARATUS FOR THE PRODUCTION OF STUFFED SAUSAGE PRODUCTS

The invention relates to an apparatus for stuffing casings or similar receptacles with paste, in particular with sausage meat or other foods in the form of paste, using a portioning means that stuffs adjustable portions of the paste through a stuffing horn or tube into a casing of a pre-defined caliber or caliber group, wherein said casing is pulled during stuffing and portion-wise from a casing holder. The term paste includes sausage fillings of any viscosity.

Apparatuses of this kind have been known for a considerable time. They are used in the meat products industry and in the butcher's trade to stuff sausage meat of the most varied recipes into casings. U.S. Pat. No. 3,553,768, for example, shows an apparatus for stuffing large diameter sausages and sizing said sausages to a particular diameter. This object is achieved by disposing an axially movable sleeve member at the end of the stuffing horn and the device for holding the sausage casing, whereby said device engages with said stuffing horn.

Through the wall of said sleeve member there is a radially disposed orifice through which compressed air can flow into said sleeve member. The sausage is guided through said sleeve member as it is formed. When the diameter is large enough to close the orifice, no air can flow into the sleeve member; the sausage has then reached the required diameter. If, however, the casing of the sausage being formed flows off the stuffing horn too quickly, and the diameter of the sausage becomes too small as a result, the sausage does not restrict the orifice for compressed air, thus allowing air to flow into the space between the sleeve member and the sausage. This flow of air is used to control an air motor in such a way that said motor pushes the sleeve member against the casing holder, thus increasing the braking power of the latter, This now causes less casing to flow off the stuffing horn, whereupon the diameter of the sausage in the sleeve member increases until the sausage again closes the orifice for compressed air; the sausage has now obtained the required diameter once again. In the case of sausage types with a smaller diameter, and especially when using sensitive casing material such as natural gut casing, the diameter of the sausage cannot be fixed accurately enough, or not at all, since the stuffing speed is usually very high for smaller sausages and the means for controlling the braking force of the casing holder in the known manner cannot respond quickly enough.

Another known apparatus of the aforementioned kind is described in the laidopen German patent application no. 35 19 021. In said apparatus, the braking force exercised on the casing holding apparatus is not adjustable. Instead, the problem of the casing flowing more quickly than required off the stuffing horn when the sausages are being stuffed, and the concomitant problem of varying sausage diameter is counteracted by inserting, after the casing holder apparatus in the form of a braking sleeve, an auxiliary braking sleeve in the direction in which the sausage is stuffed, said auxiliary braking sleeve having inwardly pointed ribs on the inside that cause the braking force of the normal casing holder to be increased. This auxiliary braking sleeve is in the form of a tube so that its free end can be moved as close as possible to the point where the sausages are twisted or clipped. Due to the restricted space at the twisting or clipping point, an embodiment of the auxiliary braking sleeve for large diameter sausages is not possible in the known embodiment. The constancy of the sausage diameter is highly dependent in said prior art on the casing material and the consistency of the emulsion. For this reason, variations in the diameter must be expected at all times. Another reason why this notorious solution is problematic is that sensitive casing material is damaged relatively easily on account of the peak loads around the ribs of the auxiliary brake sleeve member, which then causes rejections during production of the sausages.

Another notorious apparatus is described is U.S. Pat. No. 5,013,279. In the latter patent also, a chuck with ribs projecting from the inside wall is provided that essentially serves to give the sausages a curved shape, said chuck being rotated during stuffing and causing the sausages to engagingly rotate about the axis of the chuck by virtue of the engagement of said ribs. Variations in the diameter of the sausages are to be expected here, just as in the prior art discussed in the foregoing, and the risk of damage to the casing material is similarly great.

It has meanwhile become common practice to stuff certain types of sausage, for example raw sausage and boiled sausage, in natural gut casings, whereas more thin-bodied types, such as liver sausage, are preferably stuffed in synthetic casings. Whereas the caliber or diameter of synthetic casings is generally provided with very narrow tolerances, this is not so with natural gut casings. Therefore, natural casings are supplied and sold according to caliber or diameter group, for example caliber groups 18–20, 20–22, 22–24, etc., or in intermediate sizes. The latter figures are the limit values for the diameter of the casings within the caliber groups.

The portioning devices of stuffing machines ensure that the quantities of sausage meat delivered by the stuffing machines and ejected into the casings are kept exactly the same to the greatest extent possible. If these exactly equal portions successively stuffed into the natural casing of a particular caliber group, sausages of different thicknesses and hence also of different length are produced as a natural consequence, even though all these sausages contain an identical volume of sausage meat. This is caused by variations, in the order of millimeters, in the diameter of the natural casings of a particular group. When stuffing a portion into a casing of a caliber group with a diameter of 20 mm, as initially mentioned, one receives as a result a shorter sausage than when stuffing the same portion into a natural casing that has a diameter at the lower limit of the caliber group, for example 18 mm.

Sausages of different length but with the same stuffing volume are not wanted impression that short sausages contain less sausage meat than longer sausages, because customers do not perceive the small differences in diameter. The problem for producers is that packaging must be designed for the longest sausage in each respective case, as well as for the fattest sausage in a packaging unit. This involves more expenditure of packaging material compared to packaging material of identical length and diameter.

The object of the invention was therefore to develop the apparatus described at the beginning in such a way that sausages of the same length and same volume can be produced as far as possible, even if the casing used has variations in diameter, as is commonly the case with natural casings, in particular. In order to achieve this object, it is essential to ensure that the natural casing or any other sensitive synthetic casing is not damaged during stuffing and that a smaller variation of sausage diameter and length is achieved in comparison to the prior art.

Whereas former attempts to solve this technical problem involved manual control during injection of the sausages, had only modest success even when using skilled manpower, and were beset by repeated interruptions of the stuffing process due to unavoidable bursting of the sensitive natural casings, the technical problem is elegantly solved with an apparatus of the kind initially specified in that a guide tube is disposed downstream from, and as an extension to the casing holder, the internal diameter of said guide tube being approximately the same as the smaller outer diameter of the pre-defined casing caliber and/or the pre-defined casing caliber group, the guide tube having a coating of lubricant on its inner surface and that the casing flows into and through the guide tube in the process of being stuffed.

The advantage of the solution according to the patent is that well-trained personnel can now be deployed for other important work, that stuffing is simplified, that the quality of the product in the sense of the object is raised to a very high and constant level with very little susceptibility to breakdowns.

Other embodiments of the invention are described in the subclaims. One embodiment particularly worthy of mention is that in which the guide tube is approximately two thirds the length of a sausage, and advantageous in many respects is the preferred embodiment in which the lubricant in the guide tube is a water film that is injected into the guide tube in doses by nozzles, the apertures of which are located on the inside of the guide tube, whereby said nozzles may be so provided that they are distributed not only radially around the outer periphery of the guide tube near the casing holder. It may well be advantageous to distribute nozzles axially in the guide tube.

It has been found that using water as a lubricant leads to very smooth, fault-free operation and a high standard of quality. Another advantage of using water as a lubricant derives from the fact that water also acts as a cleansing agent and, if substantial amounts and pressures of water are involved, can be used to clean the apparatus after stuffing.

Another advantage derives from providing a bracing element at the exit of the guide tube, said bracing element being preferably realized in practice by one or two rollers whose rotational axis runs perpendicular to the longitudinal axis of the guide tube and whose surface extends a portion into the cross-section of the guide tube such that a counterpressure operates on the casing toward the end of stuffing process, whereby said counterpressure has a positive influence on the quality of the product.

Referring to the attached drawings, two embodiments of the invention will now be described, whereby in said drawings FIG. 1 is a side elevation view of a conventional stuffing machine, extended in accordance with the invention;

FIG. 5 is a longitudinal section, similar to that in FIG. 2, of a guide tube having a modified form of bracing element.

FIG. 6 is a front elevation view of the bracing element in FIG. 5.

Figure 1:
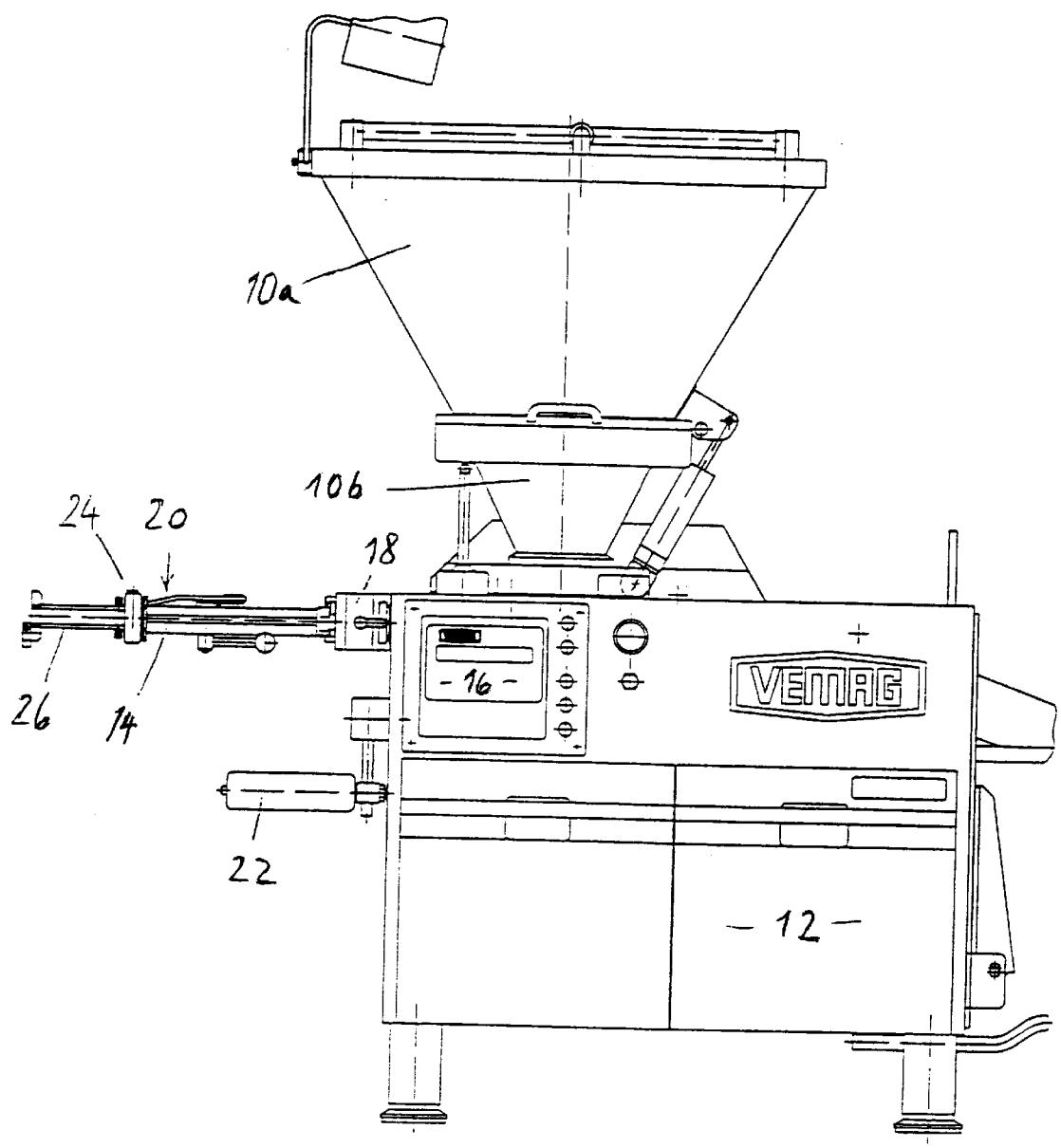

The stuffing machine shown in FIG. 1 is of conventional design. It has a conventionally separated hopper 10a, 10b into which the sausage meat to be processed is filled at the top. Under the hopper, within a machine frame 12, there is a feed pump (not shown) that conveys the sausage meat flowing from hopper 10 into a stuffing tube under pressure and portion-wise, whereby in this embodiment said stuffing tube is in the form of a twisting tube.

An electronic control system 16 is provided for producing the sausage meat portions. Said system enables the operator to specify portions of different, predefined amounts. The specifications are translated by the electronic control system 16 into commands, for example for the feed pump, such that the stuffing machine ejects precisely portioned volumes of sausage meat from the end of stuffing tube 14 at a relatively high frequency.

The stuffing machine in the embodiment shown also has a conventional twist drive 18, is fitted with a length portioning means 20, and has a control switch 22 near the stuffing tube 14. The operator operates said control switch with his or her body when the process of stuffing sausages, or injecting the sausage meat, is to start or finish.

At the rear downstream end of stuffing tube 14 there is located a conventional casing brake 24. The purpose of said brake 24 is to slow down to a sufficient extent the process whereby the casing, previously pushed in shirred form onto the stuffing tube 14, is drawn off the stuffing tube as it, the casing, is stuffed.

Up to this point, the machine described falls under the prior art.

As shown in FIG. 1, the machine has a guide tube 26 disposed coaxially to the stuffing tube 14, adjacent the stuffing tube 14 and the casing brake 24. Said guide tube 26 is shown as an enlargement in FIGS. 2 and 3 and, when one respective portion is being stuffed in this embodiment, it receives the sausage as it forms, and limits the radial expansion of the ensuing sausage to the inner diameter of the guide tube 26, which is an especially important and advantageous aspect.

Figure 2:
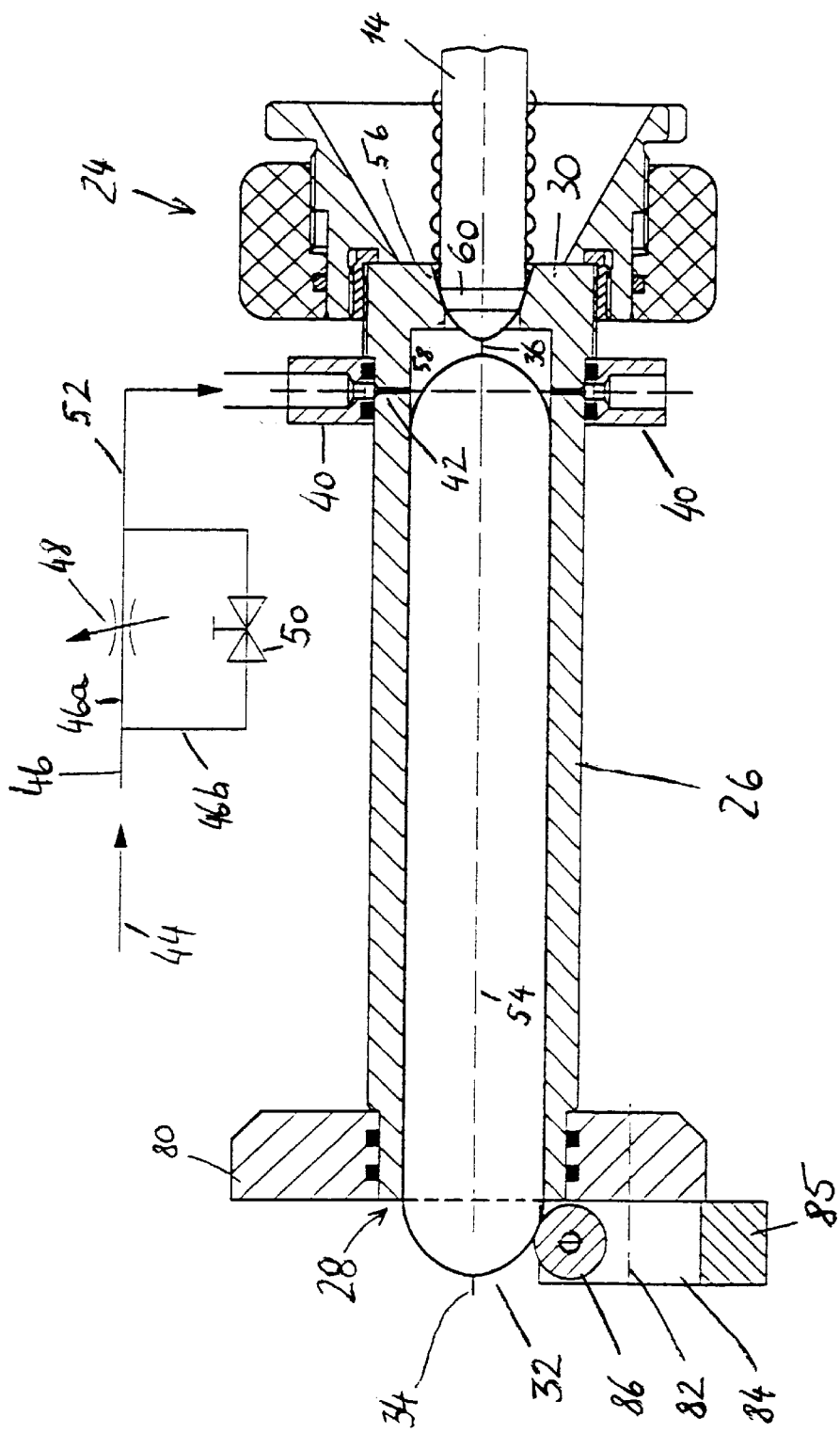
FIG. 2 is a longitudinal section of a guide tube, adapted to an embodiment including a casing brake.

In the embodiment shown in FIG. 2, the guide tube 26 has an inlet end 30 opposite its open end 28. The inner surface of the guide tube is preferably as smooth as possible and thus devoid of any radially inwardly projecting ribs, unlike in the prior art. FIG. 2 shows, within guide tube 26, a sausage 32 that has just been made, and which has a twisting point 34 at its front end and a twisting point 36 at its rear end. The internal diameter of guide tube 26 is identical to the planned diameter of all sausages 32 to be produced; this internal diameter is equal to the smallest external diameter of the caliber group of natural casing that is being used at any one time, for example 18 millimeters in the case of the caliber group 18–22.

Directly adjacent to the inlet end 30 of guide tube 26 there are located a number of nozzles 40. Said nozzles are radially disposed around guide tube 26 and have nozzle apertures 42 that radially penetrate the walls from the outside to the inside. In the case of guide tubes 26 for smaller caliber groups, it suffices to have between four and six of these nozzles 40, whereas in the case of larger calibers a larger number of such nozzles can be provided.

From a source not shown, water flows in the direction of arrow 44, as shown, into a conduit 46. Conduit 46 branches into a conduit 46a and a conduit 46b. Conduit 46a leads to a fine control valve 48 that enables precise dosage of the quantities of water flowing therethrough. Connected in parallel to the fine control valve 48 by conduit 46b there is a fast-action valve 50. The outlets of the two valves 48, 50 are conjoined in a conduit 52, which for its part is connected in a manner not shown with the inlets of nozzles 40. Hence, said nozzles 40 can be supplied with a precisely controlled amount of water that can be either small or large. What is not shown is a device with which the water can be injected or allowed to flow at an adjustable rate through nozzles 40 into the inside of guide tube 26.

Inlet end 30 of guide tube 26 according to FIG. 2 has a two-stage hole along axis 54 of the guide and stuffing tube 26, 14. Viewed from the inside, said hole comprises a spherically tapering portion 56 and an adjacent cylindrical portion 58. Stuffing tube 14, which in this case is a twisting tube that can be rotated about its own axis by the twist drive 18 shown in FIG. 1, has a plastic ring 60 around its perimeter at its free end, to the left in the drawing. Stuffing tube 14 is inserted so far into the hole of inlet end 30 in guide tube 26, and the relative diameters are so chosen that, in operation, ring 60 is within the spherical portion 56 and almost touches the inside wall of same.

Shown in the drawing, there is a shirred casing 62 that has been pushed over the stuffing tube 14. Said casing 62 is guided over ring 60 to beyond the free end of stuffing tube 14, and sealed there by means of the twisting unit 36 indicated. The inlet end 30 thus forms, in the spherical portion 56 of the hole and the stuffing tube 14 with the plastic annular ring 60 of the latter, the casing brake 24.

Figure 4:
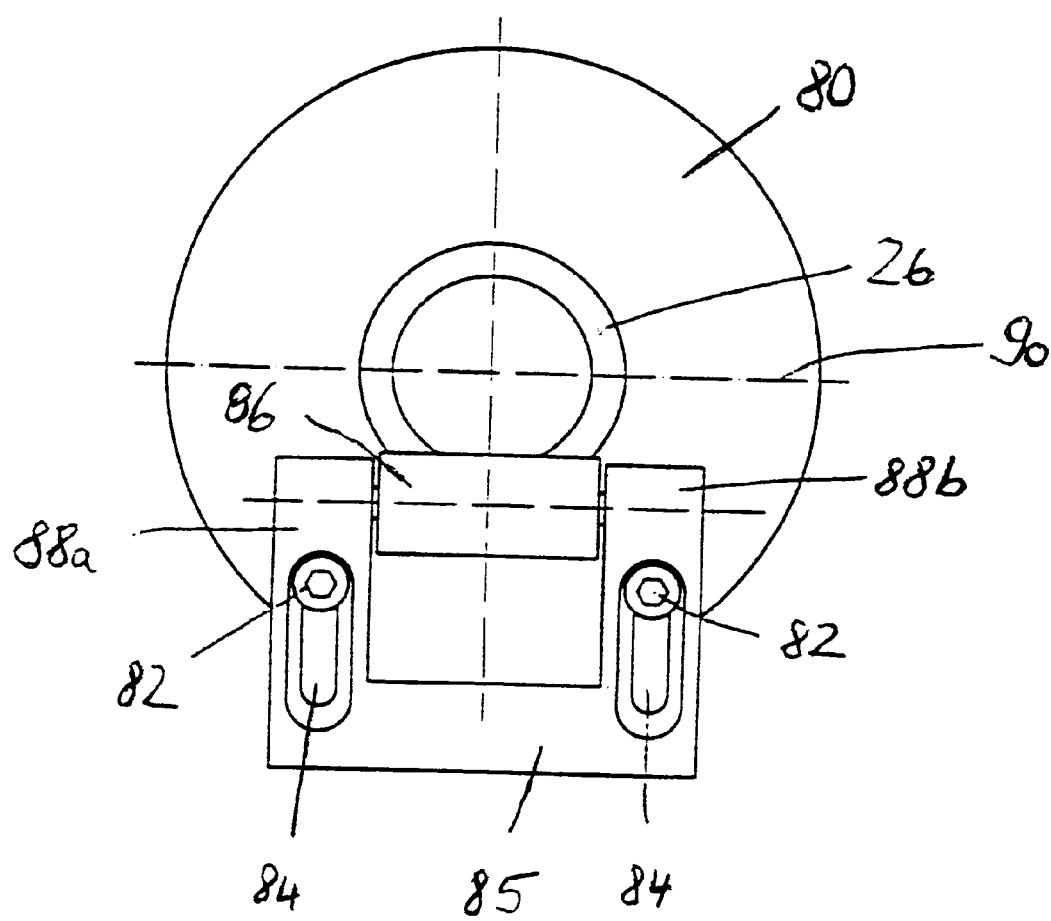
FIG. 4 is a front elevation view of the guide tube pursuant to FIG. 2 or 3, so that the arrangement of the bracing element is shown more clearly.

At the open end 28 of guide tube 26, a holder 80 is unrotatably attached that annularly surrounds the open end 28 of the guide tube 26. A pedestal 85 is adjustably attached to said holder 80 by means of two screws 82 and elongated holes 84 through which said screws pass. The pedestal carries a roller 86 in its legs 88a, 88b. The rotational axis of roller 86 runs parallel to the horizontal plane 90 indicated in FIG. 4 and the vertical position of roller 86 is adjusted in such a way that the distance of its perimeter from axis 54 of guide tube 26 is smaller than the inner radius of guide tube 26. In this way, roller 86 projects to an adjustable extent into the path of each sausage moved through guide tube 26, as one can well see from FIG. 2. In this way, roller 86 causes a counterpressure on the sausage to be produced at the end of each stuffing procedure and the subsequent twisting to form the twisting point 36. When two rollers 86 are used on holder 80, these may be arranged, for example, in separate pedestals mirrored in horizontal plane 90.

In order to work with the apparatus according to the invention, the first step is the normal one of pushing a length of shirred casing 62 onto guide tube 14 and then closing the end of casing 62, shown on the left in FIG. 2. Said closed end is then inserted with the stuffing tube 14 into the inlet end 30 of the guide tube 26 until ring 60 exercises a certain amount of force, by virtue of casing 62 being guided over it, on the spherical portion 56 of the inlet end 30 and slows down the flow of casing 62 from the stuffing tube 14 .

A first portion of sausage meat is not yet pressed or injected from the stuffing machine through stuffing tube 14 into the closed end of the casing. At this point, at the latest, the fine control valve 48 is opened to the required amount so that a little amount of water can flow into the inside of guide tube 26. A thin film of water is then produced, commencing at the inlet end 30, on the inner perimeter of guide tube 26, against which film the casing being filled is pressed by the pressure of the sausage meat, and which film operates as a lubricant layer for moving the casing through the guide tube to the open end of the latter.

The thickness of the water film can be adjusted with the help of the fine control valve 48, and if a length of casing 62 should unexpectedly burst during operation, guide tube 26 can be quickly and efficiently rinsed and cleaned without loss of time by opening the fast-action valve 50, with the result that there no significant interruption of work.

Figure 3:
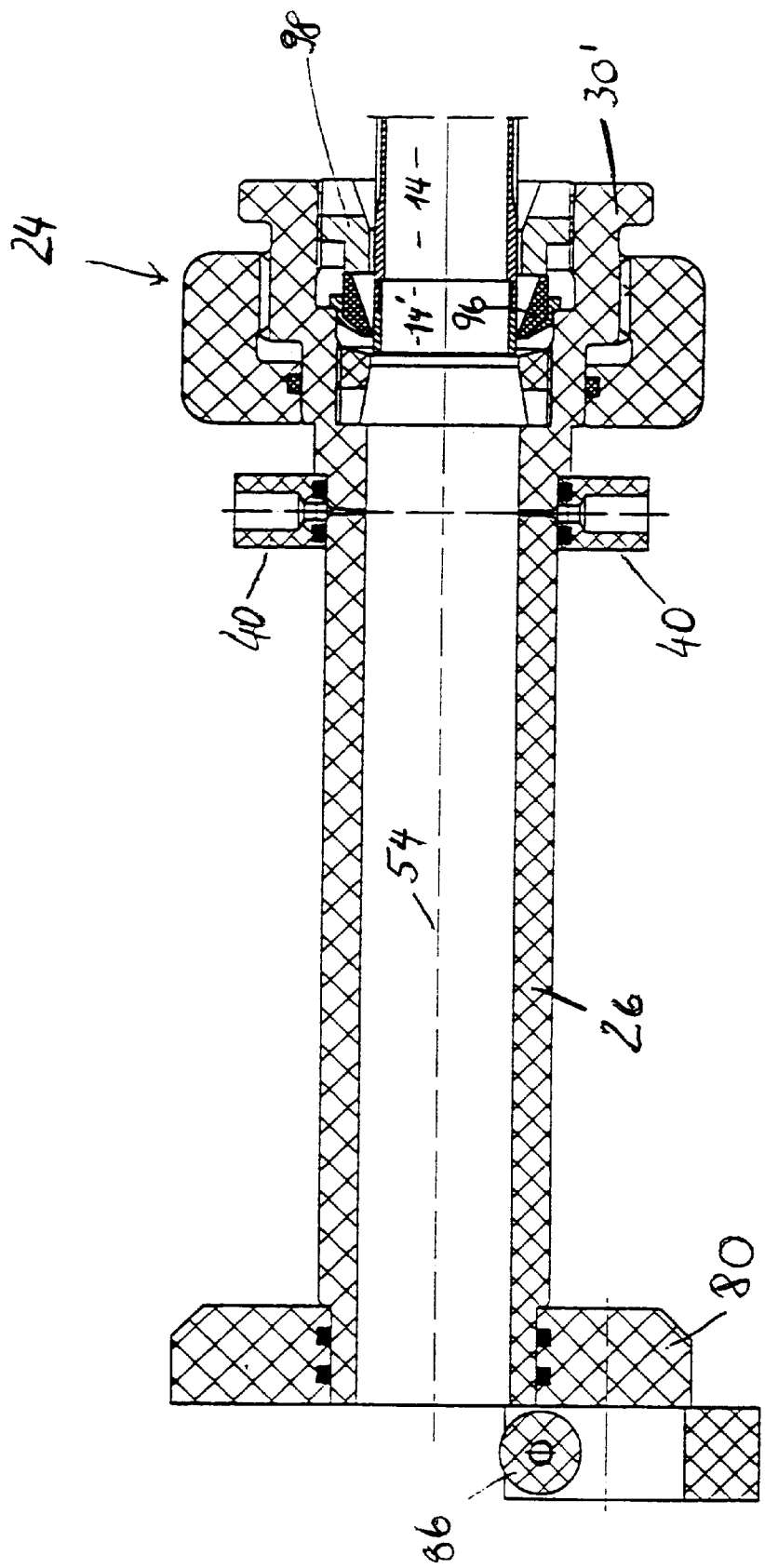
FIG. 3 is a longitudinal section of a stuffing tube for a different embodiment of casing brake.

In FIG. 3 there is shown an apparatus that differs from that in FIG. 2 only in the area of the casing brake 24. As one can see, the inflow end 30' of the stuffing tube is enlarged stepwise in this case. The actual casing brake is formed here by a braking lip 96, which acts upon the casing, not shown, at the front end 14' of stuffing tube 14. By means of a clamping ring 98 screwed into the inlet end 30' of stuffing tube 26, the pressure exerted by braking lip 96 can be adjusted. The function of the apparatus in FIG. 3 is the same—apart from the casing brake 24—as that described in association with FIG. 2.

The guide tube 26' shown in FIG. 5 is not essentially different from the embodiments described in the foregoing. In particular, it has the spherically tapering portion 56 in its inlet end 30, which is a component of an insert in guide tube 26' in the embodiment pursuant to FIG. 5 and in contrast to the embodiment pursuant to FIG. 2. Nozzle apertures 42 can be identified, as can a bracing element 86' at the open end 28 of guide tube 26'.

In the embodiment according to FIGS. 5 and 6, the bracing element 86' has two cylindrical sliding elements 90, 91; the latter are arranged parallel to each other and with a variable distance between each other—in the path of travel of the sausages directly after the open end 28 of stuffing tube 26' and can thus be adjusted in relation to each other and to guide tube 26' in such a way that the clearance between them is less than the clear diameter of guide tube 26'. A sausage being stuffed and conveyed from right to left in FIG. 5 will press with its advance end against the sliding elements 90, 91 with more or less pressure, depending on adjustment, and will not pass said elements until a certain counterpressure has been reached.

In order to set the counterpressure according to requirements, the gap between the two parallel sliding elements 90, 91 is adjustable, as already stated. For the purpose of adjustment, the cylindrical sliding elements each have two parallel threads passing through the central axis of the sliding elements, the distance between said threads being greater than the inner diameter of stuffing tube 26'. As can be seen from FIG. 5 and, especially, FIG. 6, two adjusting screws 92, 93 pass through the altogether four threads in sliding elements 90, 91, such that, in each case, an adjusting screw 92 is screwable into the threads on the left end of sliding elements 90, 91 in FIG. 6, and the other adjusting screw 93 is screwable into the two threads on the right end of sliding elements 90, 91, in FIG. 6. The rotational direction of the threads in the holes of the one sliding element is opposite to the rotational direction of the thread in the other sliding element. Thus, the threaded holes bored in sliding element 90 consist, for example, of a right-hand thread and the threaded holes bored in sliding element 91 consist of a left-hand thread.

Each adjusting screw has a cylindrical smooth portion 94 at its free end, and is each inserted with this smooth portion into a cylindrical hole 95 of a holder 80', said holder surrounding, in turn, the open end 28 of guide tube 26' in the manner described in connection with FIGS. 2 and 3. Shortly before the respective other end, each adjusting screw has a snap ring groove 96. The end of each adjusting screw 92, 93, opposite the smooth portion 94, is led through a hole 97 in the holder 80', and the axial position of the snap ring groove 96 of the adjusting screw is so chosen that the snap ring groove is located within hole 97 of holder 80. The portion of the adjusting screws 92, 93 between the smooth portion 94 and the snap ring groove 96 each has two threaded portion that engage with the threads of the threaded holes in sliding elements 90, 91. Finally, at the opposite end of each adjusting screw from the smooth portion 94, a wing nut 98 is fastened with which the adjusting screw can be manually turned. The two threaded portions of each adjusting screw 92, 93 have opposite directions of rotation, corresponding to the threaded holes 100 in the sliding elements 90, 91.

Attached to holder 80' are two holes 99 spaced apart, the parallel axes of which run parallel to axis 54 of guide tube 26'. The position of holes 99 is so chosen that they intersect one of the two holes 97 already mentioned and that a cylinder pin, not shown in the drawing, which is inserted into each hole 99 engages in the respective snap ring groove 97 of one of the two adjusting screws. This results in each adjusting screw being axially unmoveable yet rotatably fixed in holder 80'. If one now turns the two wing nuts 98 of the two adjusting screws 92, 93, the aforementioned threaded portions of the adjusting screws cause the cylindrical sliding elements 90, 91 to move toward or away from each other along the adjusting screws 92, 93 and symmetrically to axis 54 of guide tube 26'.

The clearance between the two sliding elements 90, 91 and the required counterpressure against the sausage can thus be set with the adjusting screws 92, 93.

In one embodiment of the bracing element, not shown in the drawings, said bracing element is not located outside the guide tube 26', but inside the guide tube 26' near the open end 28, and is so designed that the cross-section of the guide tube 26' for producing the counterpressure is adjustable at the open end 28.

Finally, it is remarked that the bracing element can also be designed as adjustable for a pre-defined counterpressure in cases where user of the apparatus does not need to make any changes in recipes, the consistency of the sausage meat or the casing materials.

One embodiment, not shown in the drawings, provides for the individual sausages to be separated by clipping, rather than, in accordance with the embodiments shown, by twisting. Yet another alternative embodiment envisages that twisting is not performed by the stuffing tube 14, but that the guide tube 24 is attached to a rotary drive.

The envisaged lubricant in both embodiments is water, which has proved conducive to this purpose in practical operation. Alternatively, however, it is proposed that one uses a thin-bodied edible grease instead of water, or to apply a permanent lubricating coating, such as Teflon, to the inside of guide tube 26.

What is claimed is:

1. Apparatus for stuffing casings with foods in the form of paste, comprising:
   a portioning means for supplying adjustable portions of food paste;
   a stuffing tube operably connected to said portioning means for receiving food paste discharged therefrom,
   a casing extraction device operably connected to a discharge end of said stuffing tube, said casing extraction device adapted to discharge a casing as food paste is discharged out of said stuffing tube and into the casing; and
   a guide tube operably connected to and downstream from said casing extraction device, said guide tube adapted to receive the casing as it fills with food paste discharged from said stuffing tube, said guide tubing having an internal diameter substantially equivalent to the smaller outer diameter of a pre-defined caliber or a pre-defined caliber group of the casing, said guide tube having an inner surface coated with a lubricant.

2. The stuffing apparatus of claim 1, wherein said internal diameter of said guide tube is approximately constant along the length of said guide tube.

3. The stuffing apparatus of claim 1, wherein said guide tube has a length equal to at least about half the length of a fully stuffed casing.

4. The stuffing apparatus of claim 3, wherein the length of said guide tube is approximately equal to the length of a fully stuffed casing.

5. The stuffing apparatus of claim 1, wherein said lubricant in said guide is polytetrafluoroethylene.

6. The stuffing apparatus of claim 1, wherein said lubricant in said guide is liquid at least partly covering said inner surface of said guide tube.

7. The stuffing apparatus of claim 6, wherein said liquid is a water film.

8. The stuffing apparatus of claim 1, further comprising:
   at least one nozzle operably connected to the end of said guide tube adjacent to said casing extraction device, said lubricant fed through said nozzle into said guide tube.

9. The stuffing apparatus of claim 8, wherein a plurality of nozzles are spaced about the outer periphery of said guide tube, each of said nozzles having an aperture penetrating a wall of said guide tube.

10. The stuffing apparatus of claim 6, further comprising:
    a distributor ring disposed around said guide tube and adjacent to the end of said guide tube next to said casing extraction device, said distributor ring having spaced-apart holes supplying liquid lubricant to the interior of said guide tube.

11. The stuffing apparatus of claim 6, further comprising:
    means for controlling the amount of lubricant entering the interior of said guide tube.

12. The stuffing apparatus of claim 11, further comprising:
    a fine control valve for adjusting the amount of lubricant discharged from said nozzles.

13. The stuffing apparatus of claim 12, further comprising:
    a fast-action valve operating in parallel to said fine control valve.

14. The stuffing apparatus of claim 6, wherein said liquid lubricant is injected into the interior of said guide tube at regular intervals.

15. The stuffing apparatus of claim 1, further comprising:
    a roller disposed in the path of a casing moving through said guide tube such that said roller exerts a braking force against the casing during the case stuffing process.

16. The stuffing apparatus of claim 15, wherein said roller is radially adjustable in relation to said guide tube such that a clearance between the surface of said roller and a central axis of said guide tube is less than the internal radius of said guide tube.

17. The stuffing apparatus of claim 16, wherein said roller is disposed directly after the free end of said guide tube in the direction of stuffing.

18. The stuffing apparatus of claim 1, wherein said casing extraction device includes a casing brake, the guide tube end nearest said casing extraction device forms part of the casing brake.

19. The stuffing apparatus of claim 1, further comprising:
    means for twisting off or clipping the casing, said twisting means disposed at the end of said guide tube next to said casing extraction device.

20. The stuffing apparatus of claim 1, wherein said guide tube is rotatable about its longitudinal axis and includes a controlled rotary drive to form a twisting means.

\* \* \* \* \*